July 3, 1956

E. OETIKER 2,753,148

ENGINE BRAKE VALVE

Filed July 10, 1952

INVENTOR
EDWIN OETIKER
BY Toulmin & Toulmin
ATTORNEYS

United States Patent Office 2,753,148
Patented July 3, 1956

2,753,148

ENGINE BRAKE VALVE

Edwin Oetiker, Zurich, Switzerland

Application July 10, 1952, Serial No. 298,089

Claims priority, application Switzerland July 13, 1951

2 Claims. (Cl. 251—279)

Engine brakes in which the outlet piping of the combustion gases is closed by a valve have long been known. They have the advantage that their construction is simple and therefore inexpensive, but on the other hand they have the drawback that they can only be actuated with a certain exertion of force, and are in addition often leaky, in that the sealings of the bearing pins of the valves, when they are sufficiently tightened, render operating difficult and, besides that, become leaky after a certain time. It is accordingly possible for the combustion gases to escape and to find their way into the driver's cab, or into the motor lorry, or autocar, etc.

Both drawbacks shall now be eliminated by the present invention. Easier operation will be rendered possible by the valve being adjustable by the actuating members which, looking in the direction of flow of the combustion gases, lie behind the valve and are led to the outside through the wall of the piping. Since one axle pin of the valve is no longer led outside as was formerly the case, less gas escapes and, with a suitable execution, it is even possible to carry these axle pins in their bearing holes with a good deal of play and to close these holes tight against the outside. The combustion gases can then flow round the axle pins. But since there is no essential interruption to their flow, no depositing will take place. Accordingly no dirtying of sooting of the bearings will occur.

Of particular advantage, in accordance with the invention a second parallel shaft passing through the casing wall is carried behind the axle of the closing valve, and is connected at one end to the closing member and at the other end to the operating rod.

Figure 1:
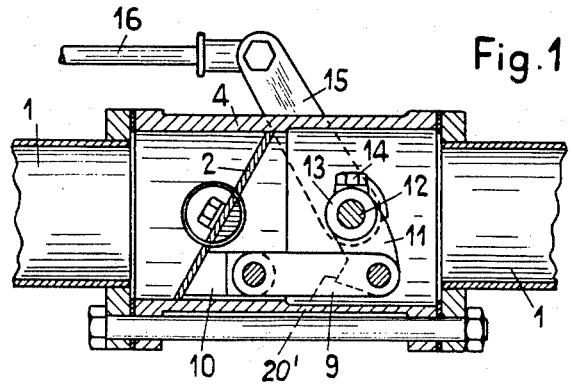
Figure 2:
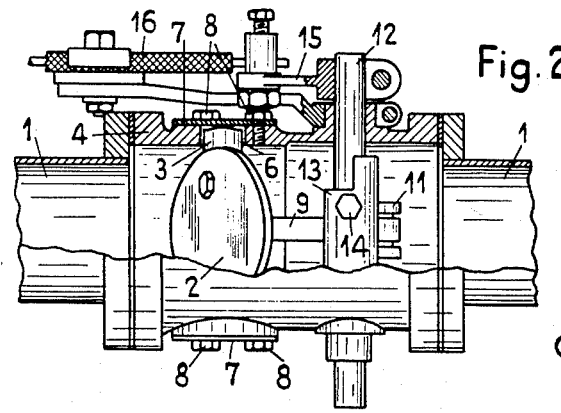

The engine brake according to the invention is further described with reference to the accompanying drawing which illustrates one form of execution by way of example, and where:

Fig. 1 shows a longitudinal section,

Fig. 2 a longitudinal section displaced by 90° with respect to Fig. 1, and

Figure 3:
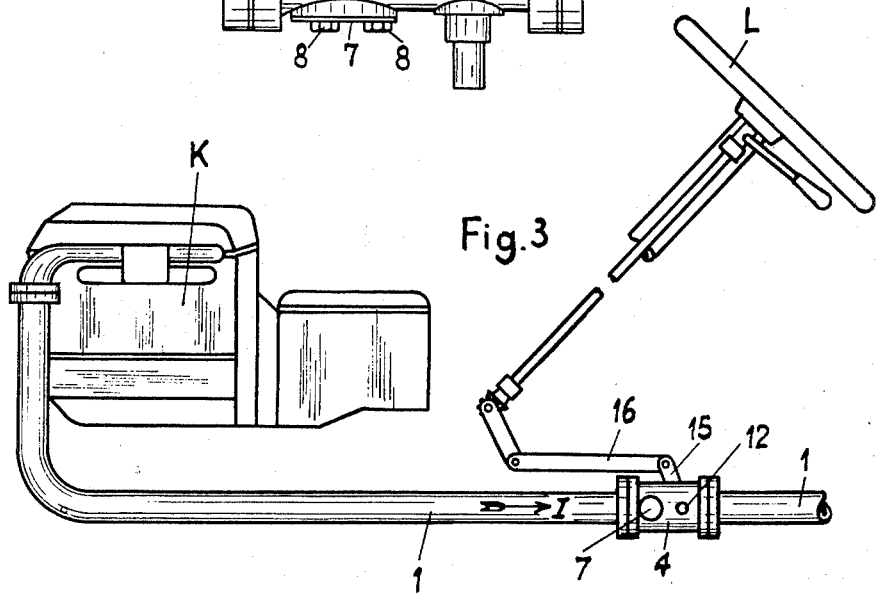

Fig. 3 the general arrangement of the engine brake diagrammatically.

In Figs. 1 and 2, the reference numeral 1 designates a pipe for the combustion gases of a motor lorry engine K (Fig. 3), which are under pressure. As closing member in this pipe a valve 2 is fitted, having axle pins 3 at both sides with which it is carried with a big play in the wall 4 of the intermediate part forming a part of the pipe, so that the gases flow round the pins 3 and can prevent the settling of impurities. The holes 6 carrying the axle pins 3 in the wall 4 are covered against the outside by cover discs 7 which in their turn are fixed by means of screws 8. For operating the valve 2 a linkage is provided, comprising a push rod 9. This rod is carried at one end on an arm 10 projecting from the valve 2, and at the other end pivotably on an arm 11, this latter being fitted on a sleeve 13 mounted on the shaft 12 parallel to the axis of rotation of the valve. By means of a screw 14 this sleeve is prevented from turning on the shaft 12. The shaft 12 is led through the walls of the pipe 1 and carries at one end a lever 15, which can be actuated by means of a linkage (Fig. 1) or cable 16 (Fig. 2). The linkage or cable 16, in the case of engine brake for instance, leads to below the steering wheel L.

The mode of operation of the described closing device is as follows:

The medium passing through the pipe 1 flows in the direction of the arrow I. Any issuing of the medium along the axle pins 3 is prevented by the cover discs 7. The sealing of these axle pins 3 then offers no difficulty whatever. In accordance with the invention the valve is operated by a linkage arranged behind the pressure chamber, which pressure chamber is located at the left of the valve 2 (Figs. 1 and 2). The sealing of the axle 12 is also easily effected, since the medium flowing through the pipe is no longer under such a high pressure after the valve 2 as it was before the said valve. Since the packing does not have to be so tight, and in particular because no restraining stuffing-boxes have to be used, the described closing arrangement can be mounted very easily. Since the push rod 9 running in the longitudinal direction of the pipe engages in the center plane between the bearing pivot members 3 of the valve, it is possible to have a more uniform stressing of the bearing parts 3, 6 than hitherto, when the axle of the valve 2 was led directly through the pipe wall at one side.

In order to set the valve 2 accurately in axial position when open, a nose 20' is preferably fixed on the arm 11. During the opening movement of the valve, this nose moves opposite to it and meets it when the valve is set accurately axially.

Through the described construction of the engine brake, the drawback is avoided that the emerging operating shaft 12 of the valve allows gases to pass when the engine brake is in service. As is known, when the engine brake is in service, the valve is subjected to a pressure of about 3 atm. gauge at the side facing the engine K. The gas loss which is really unavoidable if the valve shaft is led directly through the pipe wall, would in itself be no great drawback, since the engine is constantly supplying more gas, but on the other hand the issuing of badly smelling gases is unpleasant when occurring where the shaft emerges. However, the most important subsidiary phenomenon that appears after a shorter or longer time in service, is a choking of the bearing position, followed by a seizing of the operating shaft. It is also generally known that, with such existing constructions, it is necessary to dismantle and clean the engine brake after certain shorter or longer intervals, depending on the type of vehicle, on the amount of sooting in the exhaust pipe, and on the quantity of condensate collecting in it.

These well-known defects can now be eliminated according to the invention, by the hinged valve being pivoted at two sides on a bearing pin within the casing, whereby these pins may have a considerable radial play in their bearings, since the exhaust gases cannot flow to the outside through these bearing positions. Because of the possible big play in the bearings and the absence of packing material, such as stuffing-boxes, etc., a seizing of the valve bearings is rendered impossible.

Further, it is now possible to design the method of actuation between the hinged valve and the operating shaft located after it, so that no canting or shifting the shaft to one side in the bearings can occur when the valve shaft is moved. For the same reason, the push rod, which is located between the hinged valve and the operating shaft, is provided with play at both sides of its supports. It should also be mentioned that two symmetrically arranged push rods can be fitted instead of one push rod 9.

If, as shown in the drawing, the two axles (3 and 12) arranged behind each other are aligned in respect of each other, the flow of the exhaust gases will be but little disturbed. The described construction has also the advantage that the side spaces for taking the operating member, and partly also the closing member, can be avoided and a continuously cylindrical pipe can be used for taking away the exhaust gases.

What I claim is:

1. In a compression braking arrangement for vehicles driven by an internal combustion engine having an exhaust manifold, which arrangement comprises the combination of an exhaust pipe leading off the hot exhaust gases from the exhaust manifold to the outside, and a shut-off valve having a disc-shaped valve body rotatably disposed in said exhaust pipe, the improvement of pivot means disposed at opposite sides on the periphery of said disc-shaped valve body for supporting the same in said pipe; a pair of openings in said pipe opposite each other for receiving the ends of said pivot means therein; said pivot means being substantially shorter and of smaller diameter than said openings so as to allow for their radial play in said openings and for deposit-free flow of the hot combustion gases from said manifold to the outside when said valve is open, thereby preventing said pivot means from sticking in said openings; sealing means for hermetically sealing said openings against the escape of combustion gases therethrough to the outside of the pipe; and a valve opening and closing mechanism disposed on the side of said valve body facing away from said manifold, and spaced from said valve body, said mechanism comprising a shaft parallel to the axis of rotation of said valve body, bores in said pipe closely receiving the ends of said shaft, one of the ends of which extends out of said pipe for connection with an operating mechanism, an arm mounted on said shaft to be displaced therewith, a projection on said arm serving as a stop for said valve body when in open position, and a linking means connecting the free end of said arm hingedly with a rim portion of said valve body intermediate said pivot means and lying in the same radial direction from the longitudinal axis of said pipe as the free end of said arm.

2. A compression braking arrangement for vehicles driven by an internal combustion engine having an exhaust manifold, which arrangement comprises the combination of an exhaust pipe leading off the hot exhaust gases from the exhaust manifold to the outside; a shut-off valve having a disc-shaped valve body rotatably disposed in said exhaust pipe; pivot means disposed at opposite sides on the periphery of said disc-shaped valve body for supporting the same in said pipe; a pair of openings in said pipe opposite each other for receiving the ends of said pivot means therein; said pivot means being substantially shorter and of smaller diameter than said openings so as to allow for their radial play in said openings and for deposit-free flow of the hot combustion gases from said manifold to the outside when said valve is open, thereby preventing said pivot means from sticking in said openings; sealing means for hermetically sealing said openings against the escape of combustion gases therethrough to the outside of the pipe; and a valve opening and closing mechanism disposed on the side of said valve body facing away from said manifold, and spaced from said valve body, said mechanism comprising a shaft parallel to the axis of rotation of said valve body, bores in said pipe closely receiving the ends of said shaft, one of the ends of which extends out of said pipe for connection with an operating mechanism, an arm mounted on said shaft to be displaced therewith, and a linking means connecting the free end of said arm hingedly with a rim portion of said valve body intermediate said pivot means and lying in the same radial direction from the longitudinal axis of said pipe as the free end of said arm.

References Cited in the file of this patent

UNITED STATES PATENTS

| 1,247,930 | Campbell | Nov. 27, 1917 |
| 1,381,511 | Smith | June 14, 1921 |
| 1,519,213 | Moore | Dec. 16, 1924 |
| 1,573,417 | Nolen | Feb. 16, 1926 |
| 1,620,100 | Hoxton | Mar. 8, 1927 |
| 2,343,786 | Martin | Mar. 7, 1944 |
| 2,596,869 | Ross | May 12, 1952 |

FOREIGN PATENTS

| 207,290 | Switzerland | 1940 |
| 482 | Great Britain | 1863 |